US009319599B2

(12) United States Patent
Okazawa et al.

(10) Patent No.: US 9,319,599 B2
(45) Date of Patent: Apr. 19, 2016

(54) IMAGE PROCESSING APPARATUS, IMAGE PROCESSING METHOD, AND NON-TRANSITORY STORAGE MEDIUM STORING AN IMAGE PROCESSING PROGRAM

(71) Applicant: Olympus Corporation, Shibuya-ku, Tokyo (JP)

(72) Inventors: Atsuro Okazawa, Hino (JP); Teruaki Yamasaki, Hino (JP); Takeshi Fukutomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 83 days.

(21) Appl. No.: 14/496,642

(22) Filed: Sep. 25, 2014

(65) Prior Publication Data
US 2015/0092088 A1 Apr. 2, 2015

(30) Foreign Application Priority Data

Sep. 27, 2013 (JP) .................................. 2013-202549

(51) Int. Cl.
*H04N 5/243* (2006.01)
*H04N 5/369* (2011.01)
*H04N 5/232* (2006.01)

(52) U.S. Cl.
CPC ........... *H04N 5/243* (2013.01); *H04N 5/23212* (2013.01); *H04N 5/3696* (2013.01)

(58) Field of Classification Search
CPC .. H04N 5/243; H04N 5/3696; H04N 5/23212
See application file for complete search history.

(56) References Cited

U.S. PATENT DOCUMENTS

2013/0002911 A1* 1/2013 Miyashita .......... H04N 5/23212
348/247

FOREIGN PATENT DOCUMENTS

JP 3592147 11/2004
JP 2010-062640 3/2010

* cited by examiner

*Primary Examiner* — Christopher K Peterson
(74) *Attorney, Agent, or Firm* — John C. Pokotylo; Straub & Pokotylo

(57) ABSTRACT

An image processing apparatus includes a gain correcting unit and a gain estimating unit. The gain correcting unit corrects a gain of a pixel output of a phase-difference detecting pixel. The gain estimating unit estimates the gain with which to correct the pixel output of the phase-difference detecting pixel. The gain estimating unit includes a provisional true-value calculating unit configured to calculate a pixel output of a provisional true-value calculating pixel, in accordance with a correlation of the pixel outputs between a base block including the phase-difference detecting pixel and a reference block set in a search area for which a block similar to the base block is searched.

18 Claims, 5 Drawing Sheets

FIG. 2

IMAGE PROCESSING APPARATUS, IMAGE PROCESSING METHOD, AND NON-TRANSITORY STORAGE MEDIUM STORING AN IMAGE PROCESSING PROGRAM

CROSS-REFERENCE TO RELATED APPLICATIONS

This application is based upon and claims the benefit of priority from the prior Japanese Patent Application No. 2013-202549, filed Sep. 27, 2013, the entire contents of which are incorporated herein by reference.

BACKGROUND OF THE INVENTION

1. Field of the Invention

This invention relates to an image processing apparatus and an image processing method, both designed to process the pixel outputs of an imaging element in which some pixels are used as focal point detecting pixels of a phase-difference type, and also relates to a non-transitory storage medium that stores an image processing program.

2. Description of the Related Art

An imaging apparatus that utilizes some of the pixels of an imaging element as phase-difference detecting pixels, is proposed in, for example, Japanese Patent No. 3592147. In the imaging apparatus proposed in Japanese Patent No. 3592147, some of the pixels of the imaging element are used as phase-difference detecting pixels, and light beams coming from an object through different pupil regions symmetric to the optical axis of the photographing lens are focused at the phase-difference detecting pixels. The phase-difference detecting pixels therefore detect the phase difference between the light beams, thereby determining the focusing state of the photographing lens.

A part of each phase-difference detecting pixel is, for example, shielded from light and receives only one of the light beams coming through the different pupil regions of the photographing lens. Thus, the phase-difference detecting pixels are deficient, and cannot be used as-is to form an image. In the imaging apparatus proposed in Jpn. Pat. Appln. KOKAI Publication No. 2010-062640, the outputs of the phase-difference detecting pixels are therefore adjusted in terms of gain, or interpolated by using the signals output from the pixels adjacent to the phase-difference detecting pixels.

BRIEF SUMMARY OF THE INVENTION

According to a first aspect of the invention, an image processing apparatus is designed to process pixel outputs of an imaging element including imaging pixels and phase-difference detecting pixels arranged in a phase-difference detecting direction. The apparatus comprises: a gain correcting unit configured to correct a gain of the pixel output of the phase-difference detecting pixel; and a gain estimating unit configured to estimate the gain with which to correct the pixel output of the phase-difference detecting pixel. The gain estimating unit includes a provisional true-value calculating unit configured to calculate a pixel output of a provisional true-value calculating pixel, in accordance with a correlation of the pixel outputs between a base block including the phase-difference detecting pixel and a reference block set in a search area for which a block similar to the base block is searched.

According to a second aspect of the invention, an image processing method is designed to process pixel outputs of an imaging element including imaging pixels and phase-difference detecting pixels arranged in a phase-difference detecting direction. The method comprises: calculating a pixel output of a provisional true-value calculating pixel in accordance with a correlation of the pixel outputs between a base block including a phase-difference detecting pixel and a reference block set in a search area in which the base block is included; estimating a gain from a ratio of the pixel output of the provisional true-value calculating pixel to the pixel output of the phase-difference detecting pixel; and correcting a gain of the pixel output of the phase-difference detecting pixel in accordance with the gain estimated.

According to a third aspect of the invention, a non-transitory storage medium stores an image processing program for processing pixel outputs of an imaging element including imaging pixels and phase-difference detecting pixels arranged in a phase-difference detecting direction. The program describes: calculating a pixel output of a provisional true-value calculating pixel in accordance with a correlation of the pixel outputs between a base block including a phase-difference detecting pixel and a reference block set in a search area in which the base block is included; estimating a gain from a ratio of the pixel output of the provisional true-value calculating pixel to the pixel output of the phase-difference detecting pixel; and correcting a gain of the pixel output of the phase-difference detecting pixel in accordance with the gain estimated.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing the pixel arrangement in an imaging element;

DETAILED DESCRIPTION OF THE INVENTION

An embodiment of this invention will be described below, with reference to the accompanying drawings.

Figure 1:
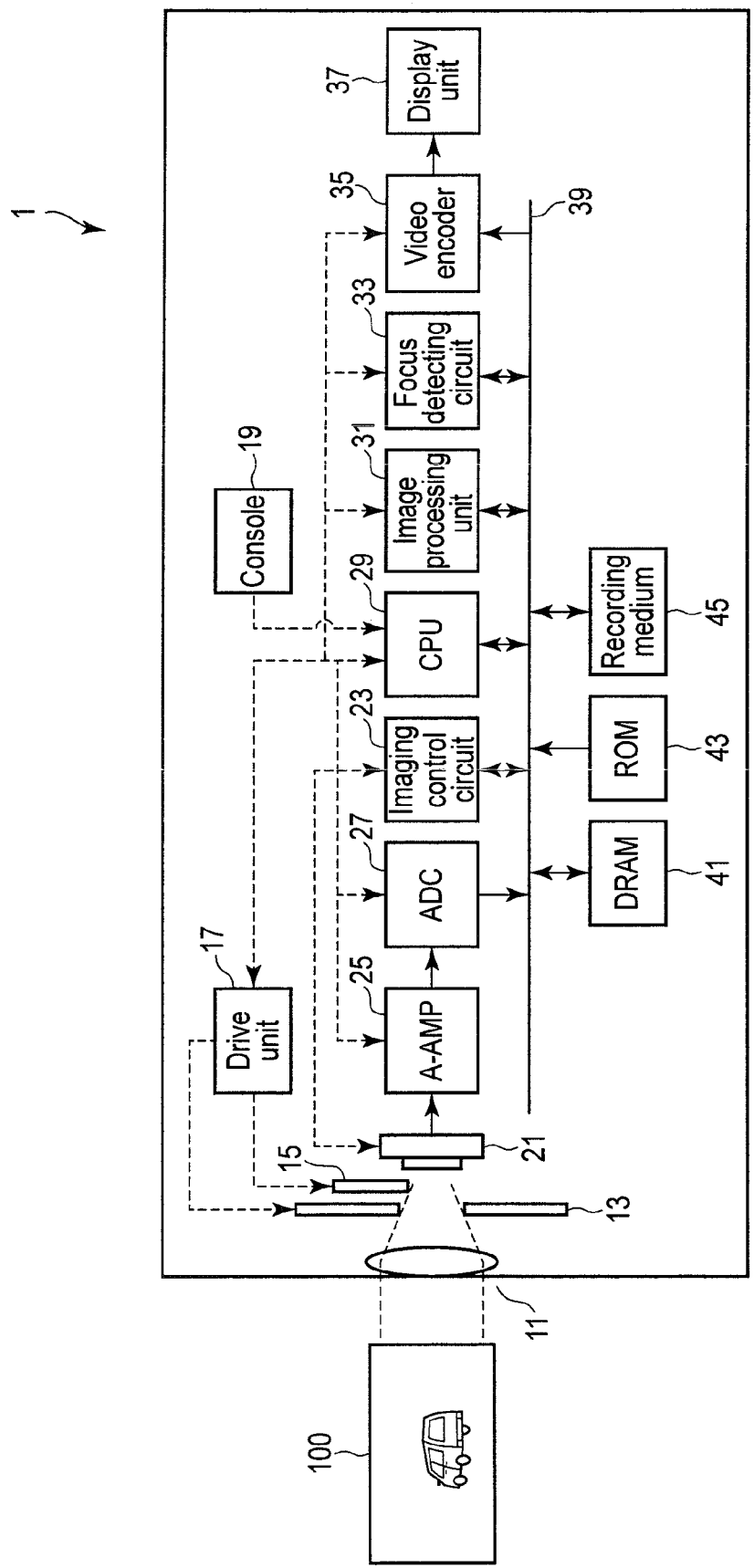
FIG. 1 is a block diagram showing the configuration of a digital camera that is an example of an imaging apparatus having an image processing apparatus according to one embodiment of this invention.

FIG. 1 is a block diagram showing the configuration of a digital camera (hereinafter, referred to as "camera") that is an example of an imaging apparatus having an image processing apparatus according to one embodiment of this invention. In FIG. 1, the solid-line arrows indicate the flow of data, and the broken-line arrows indicate the flow of control signals.

Camera 1 shown in FIG. 1 has a photographing lens 11, a diaphragm 13, a mechanical shutter 15, a drive unit 17, a console 19, an imaging element 21, an imaging control circuit 23, an A-AMP 25, an analog-to-digital converter (ADC) 27, a central processing unit (CPU) 29, an image processing unit 31, a focus detecting circuit 33, a video encoder 35, a display unit 37, a bus 39, a dynamic random access memory (DRAM) 41, a read only memory (ROM) 43, and a recording medium 45.

The photographing lens 11 is a photographing optical system for forming an image of an object 100 at the imaging element 21. The photographing lens 11 has a focusing lens configured to adjust the focal position, and may be configured as a zoom lens. The diaphragm 13 is arranged on the optical axis of the photographing lens 11, and has a variable aperture diameter. The diaphragm 13 controls the intensity of the light beam coming from the object 100 through the photographing lens 11. The mechanical shutter 15 is configured to open and close. The mechanical shutter 15 adjusts the time the light beam coming from the object 100 is applied to the imaging element 21 (exposure time for the imaging element 21). The mechanical shutter 15 may be a focal plane shutter or a lens shutter, either of which is well known in the art. The drive unit 17 drives and controls the photographing lens 11, diaphragm 13, and mechanical shutter 15 in accordance with control signals supplied from the CPU 29.

The console 19 includes various buttons such as a power button, a release button, a video button, a playback button, a menu button, and various operation members such as a touch panel. The console 19 detects the operation state of any operation member, and outputs to the CPU 29 a signal showing any operation state detected. The console 19 may be operated to select the shooting mode of the camera 1. That is, the user may operate the console 19 to select either the still-picture photographic mode or the video recording mode. In the still-picture photographic mode, the camera 1 photographs still pictures. In the video recording mode, the camera 1 records videos.

The imaging element 21 is arranged on the optical axis of the photographing lens 11 at the rear of the mechanical shutter 15 and at the position where the photographing lens 11 focuses the light beam coming from the object. The imaging element 21 comprises photodiodes, serving as pixels, which are arranged in a two-dimensional pattern. In this embodiment, the imaging element 21 has imaging pixels for acquiring an image to record or display, and phase-difference detecting pixels for detecting the focal point.

The photodiodes constituting the imaging element 21 generate electrical charges corresponding to the amounts of light they receive. The electrical charge each photodiode generates is accumulated in the capacitor connected to the photodiode. The charge accumulated in each capacitor is read as an image signal. In this embodiment, the imaging element 21 has different charge reading schemes. The electrical charge accumulated in the imaging element 21 is read out in response to a control signal coming from the imaging control circuit 23.

In front of the photodiodes constituting the pixels, a color filter, of the Bayer arrangement for example, is provided. The Bayer arrangement has lines in which R pixels and G (Gr) pixels are alternately arranged in the horizontal direction, and also lines in which G (Gb) pixels and B pixels are alternately arranged in the horizontal direction.

The imaging control circuit 23 sets a reading scheme for the imaging element 21 in accordance with the control signal coming from the CPU 29. The imaging control circuit 23 then controls the reading of image signals from the imaging element 21 in accordance with the reading scheme so set. It may be requested that the pixel data should be read from the imaging element 21 in real time. In such a drive mode, the pixel data generated by pixels of the same color are mixed or the pixel data generated in some pixels are discarded, so that the pixel data may be read at high speed. In another drive mode, it may be requested that the image should be displayed at high resolution, rather than in real time. In this drive mode, the pixel data of all pixels are read, not mixing or discarding the pixel data, thereby maintaining the high resolution.

Controlled by the imaging control circuit 23, the A-AMP 25 amplifies the image signal read from the imaging element 21. The ADC 27, which operates in conjunction with the imaging element 21, imaging control circuit 23, and A-AMP 25 to function as an imaging unit, converts the image signal output from the A-AMP 25 to a digital image signal (pixel data). Hereinafter, a group of pixel data will be referred to as "imaging data."

The CPU 29 controls the other components of the camera 1 in accordance with the programs stored in the ROM 43. The image processing unit 31 performs various image processes on the imaging data, generating image data. To record a still picture, for example, the image processing unit 31 processes the imaging data, generating still picture data. Similarly, to record a video, the image processing unit 31 processes the imaging data, generating video data. To display a live view, the image processing unit 31 performs a display image process, generating display image data. The configuration of the image processing unit 31 will be described later in detail.

The focus detecting circuit 33 acquires pixel data from the phase-difference detecting pixels, and performs a known phase-difference detecting method, calculating the defocus direction and defocus value from the pixel data.

The video encoder 35 receives the display image data generated in the image processing unit 31 and converts to a video signal. The video signal is input to the display unit 37. The display unit 37 displays the image represented by the video signal.

The display unit 37 is, for example, a liquid crystal display or an organic EL display, and is arranged on, for example, the back of the camera 1. The display unit 37 displays images as the video encoder 35 performs its function. The display unit 37 is used to display live views or the images already recorded.

The bus 39 is connected to the ADC 27, CPU 29, the image processing unit 31, the focus detecting circuit 33, the video encoder 35, the DRAM 41, the ROM 43, and the recording medium 45. The bus 39 functions as a transfer path for the various data generated in these components.

The DRAM 41 is an electrically programmable memory, and temporarily stores various data, such as imaging data (pixel data), record image data, display image data, and data processed in the CPU 29. To store the data temporarily, a synchronous dynamic random access memory (SDRAM) may be used. The ROM 43 is a nonvolatile memory such as a mask ROM or a flash memory. The ROM 43 stores various data such as the programs for use in the CPU 29 and the values for adjusting the camera 1. The recording medium 45 is incorporated in the camera 1 or is removably provided in the camera 1, and records the record image data in the form of an image file of a specific format.

Figure 2:
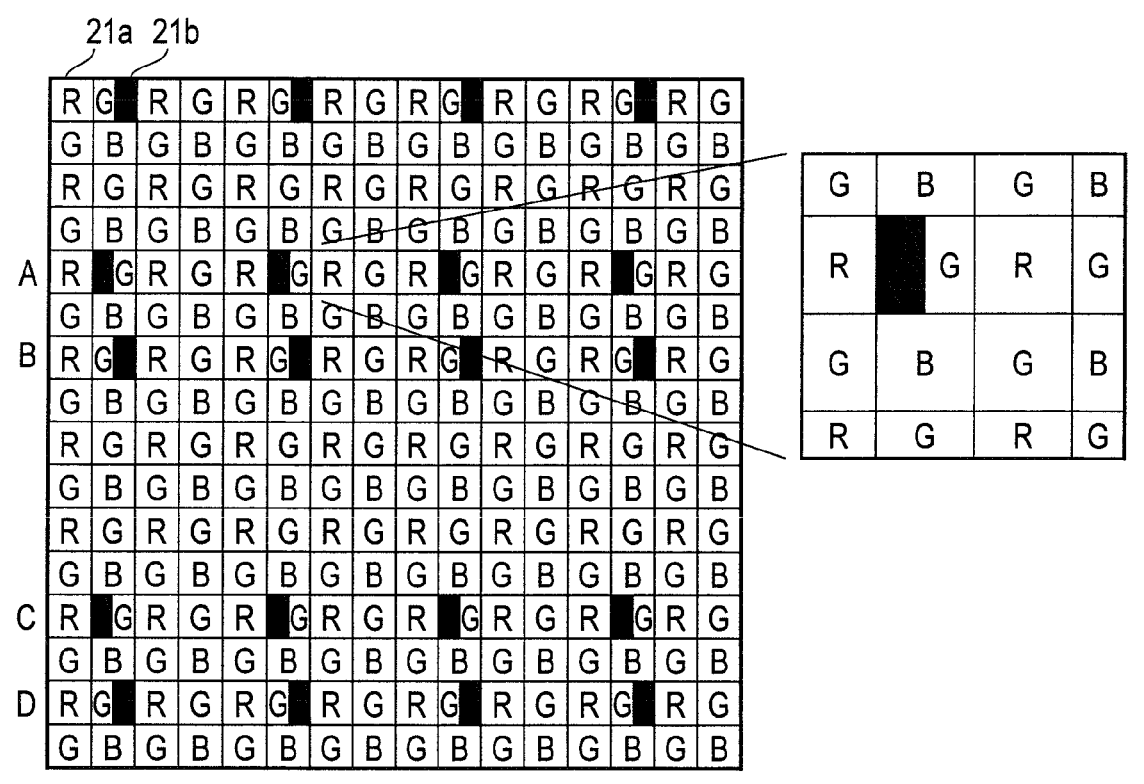

The configuration of the imaging element 21 will be described with reference to FIG. 2. FIG. 2 is a diagram showing how the pixels are arranged in the imaging element 21. Some of the pixels are magnified and shown in the right part of FIG. 2. FIG. 2 shows pixels in the Bayer arrangement.

However, the pixel arrangement is not limited to the Bayer arrangement. Various available arrangements can be utilized.

As described above, the imaging element 21 of the Bayer arrangement has pixel lines in which R pixels and G (Gr) pixels are alternately arranged in the horizontal direction, and pixel lines in which G (Gb) pixels and B pixels are alternately arranged in the horizontal direction. In other words, pixel sets, each consisting of four pixels, a Gr pixel, R pixel, Gb pixel, and B pixel magnified in the right part of FIG. 2, are repeatedly arranged in both the horizontal direction and the vertical direction.

In this embodiment, phase-difference detecting pixels 21b are arranged at some of the imaging pixels 21a. The phase-difference detecting pixels are pixels each having the left half or the right half covered with shield film. In the case shown in FIG. 2, any line of phase-difference detecting pixels, each having the left half covered with shield film (hereinafter called "right-open phase-difference detecting pixel") is arranged close to, in a vertical direction, a line of phase-difference detecting pixels, each having the right half covered with shield film (hereinafter called "left-open phase-difference detecting pixel").

The more pixels the imaging element has, the smaller the area each pixel will occupy. The same image is therefore focused on any pixels adjacent to one another. This is why the phase-difference detecting pixels are so arranged as shown in FIG. 2. Due to such arrangement, a phase-difference detecting pixel in row A and a phase-difference detecting pixel in row B are able to detect a phase difference. Similarly, a phase-difference detecting pixel in row C and a phase-difference detecting pixel in row D are able to detect a phase difference.

In the configuration of FIG. 2, the shielded region of any phase-difference detecting pixel is either the left half or the right half. The phase-difference detecting pixel can therefore detect a phase difference in the horizontal direction. The shielded region of any phase-difference detecting pixel may be the upper half or the lower half. The phase-difference detecting pixel can therefore detect a phase difference in the vertical direction. The shielded region of any phase-difference detecting pixel may be an upper corner or a lower corner. The phase-difference detecting pixel can therefore detect a phase difference in the slantwise direction. Also, the shielded region of any phase-difference detecting pixel need not be half (½) if it has a sufficient area. Additionally, a G pixel is arranged in a phase-difference detecting pixel in FIG. 2; however, a phase-difference detecting may be substituted with an R pixel or B pixel. In the imaging element 21 shown in FIG. 2, a part of each phase-difference detecting pixel is shielded, thus dividing the pupil. However, it is sufficient for any phase-difference detecting pixel to receive either of two light beams coming from the object through two different parts of the photographing lens 11, respectively. In view of this, part of the phase-difference detecting pixel may be configured to not be shielded from light, and a micro-lens may be used to divide the pupil. In the pixel arrangement of FIG. 2, the phase-difference detecting pixels are arranged at an interval of four pixels in the horizontal direction. However, the interval of arranging the phase-difference detecting pixels is not limited to this.

Since part of each phase-difference detecting pixel is shielded from light, the amount of light it receives is reduced. The amount of light reduction depends on the area and position of the shield formed on the phase-difference detecting pixel, the angle at which light is applied to the phase-difference detecting pixel, and the image height. The amount of light reduction is compensated for in the image processing unit 31.

Figure 3:
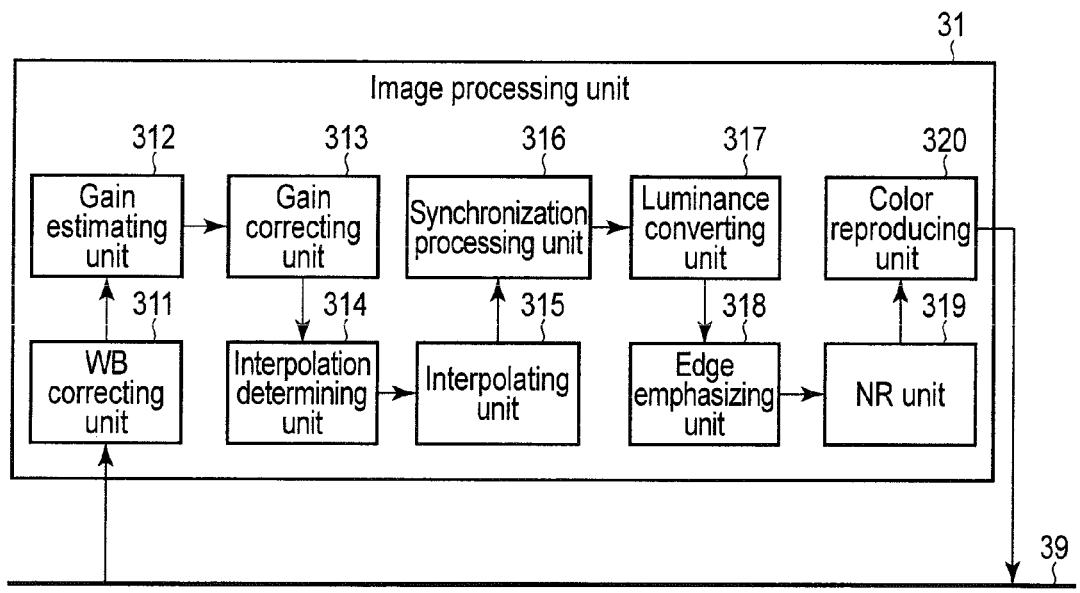
FIG. 3 is a diagram showing in detail the image processing unit incorporated in the digital camera.

FIG. 3 is a diagram showing in detail the image processing unit 31 incorporated in the digital camera. Any component of the camera, other than the image processing unit 31, is not illustrated in FIG. 3. As shown in FIG. 3, the image processing unit 31 has a white balance (WB) correcting unit 311, a gain estimating unit 312, a gain correcting unit 313, an interpolation determining unit 314, an interpolating unit 315, a synchronization processing unit 316, a luminance converting unit 317, an edge emphasizing unit 318, a noise reducing (NR) unit 319, and a color reproducing unit 320.

The WB correcting unit 311 amplifies each color component of the imaging data with a prescribed gain, correcting the color balance of the image represented by the imaging data.

The gain estimating unit 312 calculates a function for estimating the gain with which to correct the pixel output of any phase-difference detecting pixel in the gain correcting unit 313. The function represents the decrease in the amount of light received at the phase-difference detecting pixel with respect to the amount of light received at any imaging pixel. This decrease in the amount of light is calculated from the ratio of the output of the phase-difference detecting pixel to the output of an imaging pixel adjacent to the phase-difference detecting pixel. The gain correcting unit 313 corrects the pixel output of the phase-difference detecting pixel in accordance with the gain estimated in the gain estimating unit 312. The gain estimating unit 312 and gain correcting unit 313 will be described later in detail.

The interpolation determining unit 314 determines the application ratio of the pixel output of the phase-difference detecting pixel, the gain of which has been corrected by the gain correcting unit 313. The application ratio is the weighting coefficient used in a weighted addition, for example adding the gain-corrected pixel data output from the phase-difference detecting pixel to the pixel data output from the pixels around the phase-difference detecting pixel. The pixels around the phase-difference detecting pixel are four imaging pixels of the same color (the same component in the Bayer arrangement), which surrounds the phase-difference detecting pixel. The pixels around the phase-difference detecting pixel are, of course, not limited to four pixels. The weighting coefficient is determined from, for example, the dispersion between the pixel outputs of the imaging pixels around the phase-difference detecting pixel. The interpolating unit 315 performs interpolation (weighted addition) on the output of the gain adjusted phase-difference detecting pixel by the gain correcting unit 313 and the pixel outputs of the imaging pixels around the phase-difference detecting pixel, in accordance with the application ratio determined by the interpolation determining unit 314.

The synchronization processing unit 316 converts the imaging data output through the imaging element 21 in accordance with, for example, the Bayer arrangement, in which each pixel corresponds to one color component, to image data in which each pixel corresponds to a plurality of color components. The luminance converting unit 317 converts the luminance characteristic (gamma characteristic) of the image data to a luminance characteristic appropriate for displaying and recording the image. The edge emphasizing unit 318 multiplies an edge signal extracted from the image data by, for example, a band-pass filter by an edge emphasizing coefficient. The resultant product is added to the image data, emphasizing the edge (contour) components of the image data. The NR unit 319 performs, for example, a coring process on the image data, removing noise components from the image data. The color reproducing unit 320 performs various processes on the image data, achieving desirable color reproduction. Among these processes is a color matrix calculation. In the color matrix calculation, the image data is multiplied by a color matrix coefficient that accords with, for example, the white balance mode. Furthermore, the color reproducing unit 320 corrects the saturation and hue of the image.

Figure 4:
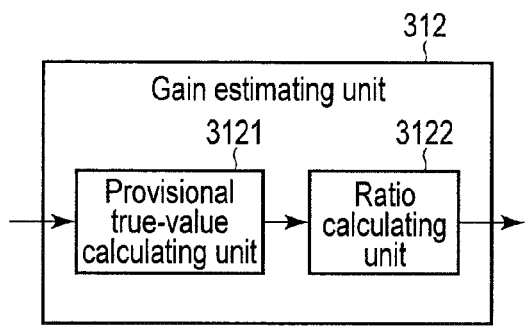
FIG. 4 is a diagram showing the configuration of the gain estimating unit incorporated in the image processing unit.

FIG. 4 is a diagram showing the configuration of the gain estimating unit 312. As shown in FIG. 4, the gain estimating unit 312 has a provisional true-value calculating unit 3121 and a ratio calculating unit 3122.

The provisional true-value calculating unit 3121 performs provisional true-value calculation, calculating the pixel output of an imaging pixel (provisional true-value calculating pixel), which the ratio calculating unit 3122 uses as a basis to calculate the ratio. The ratio calculating unit 3122 calculates the ratio of the pixel output of the phase-difference detecting pixel to the pixel output of the provisional true-value calculating pixel, thereby generating a function for correcting the gain of the pixel output of the phase-difference detecting pixel.

Figure 5:
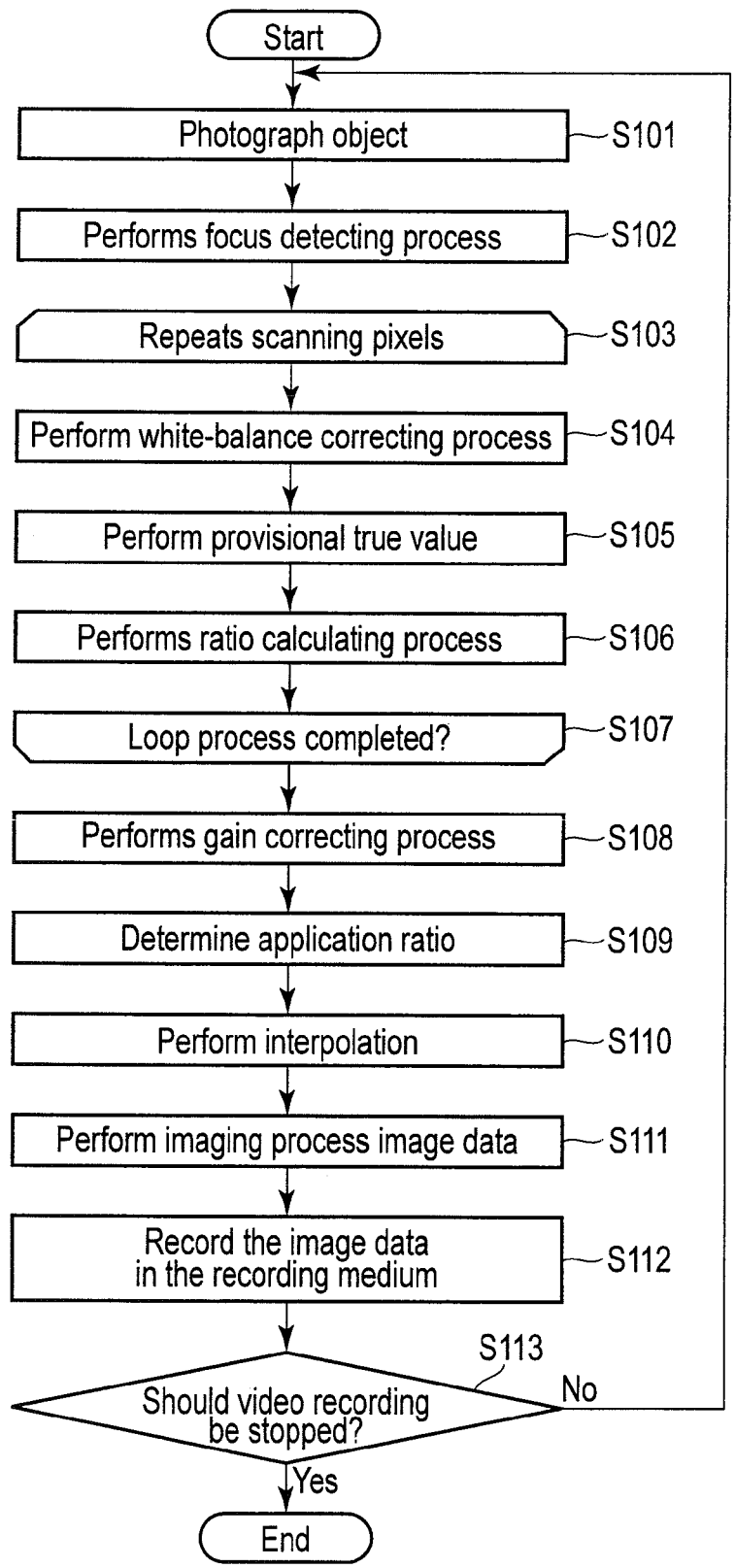
FIG. 5 is a flowchart showing a video recording process.

How the imaging apparatus according to this embodiment operates will be explained below. FIG. 5 is a flowchart showing how the imaging apparatus records video. The processes shown in the flowchart of FIG. 5 are executed by the CPU 29 in accordance with the programs stored in the ROM 43. The process sequence shown in FIG. 5 can be applied to record a still picture and to record a live view.

At the start of the operation sequence of FIG. 5, the CPU 29 causes the imaging element 21 to photograph (performs exposure) the object, generating an image signal (Step S101). The image signal is read from the imaging element 21 in a reading scheme according to a preset drive mode. The image signal thus read is amplified by the A-AMP 25, converted to digital data in the ADC 27, and temporarily stored as imaging data in the DRAM 41.

Next, the CPU 29 performs a focus detecting process (Step S102). Here, the CPU 29 causes the focus detecting circuit 33 to detect the focal point. In response to the instructions for the focus detecting process, the focus detecting circuit 33 reads, from the imaging data temporarily stored in the DRAM 41, the pixel data pertaining to any phase-difference detecting pixel. From this pixel data, the defocus direction and defocus value of the photographing lens 11 are calculated by the known phase-difference detecting method. Then, the CPU 29 controls the drive unit 17 in accordance with the defocus direction and defocus value of the photographing lens 11 which have been detected by the focus detecting circuit 33, thus achieving focusing of the photographing lens 11.

After achieving focusing, the CPU 29 causes the image processing unit 31 to perform image processing. The image processing unit 31 repeats scanning of the pixels in the imaging data and selects pixel data (Step S103). The pixel scanning is performed, for example, from the upper-left pixel to the lower-right pixel. In a loop process, it suffices to correct the output of any phase-difference detecting pixel. Thus, the pixel data of the pixels other than any phase-difference detecting pixel may not be selected in Step S103. In this case, Step S104 of correcting the white balance will be performed outside the loop process.

After the image processing unit 31 selects pixel data, the WB correcting unit 311 of the image processing unit 31 corrects the white balance of the pixel data (Step S104). Then, the provisional true-value calculating unit 3121 of the gain estimating unit 312 performs provisional true-value calculation (Step S105). The provisional true-value calculation will be explained below.

Figures 6, 7:
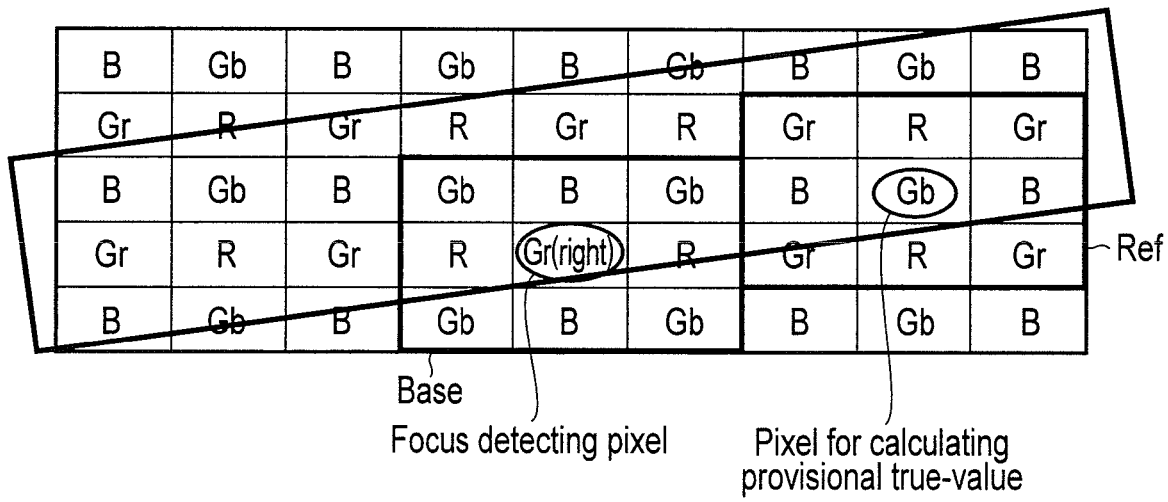
FIG. 6 is a diagram explaining a provisional true-value calculating process.
FIG. 7 is a diagram specifying the pixels that calculate a provisional true-value when a pattern extending slantwise over the reference block is focused on the photographing element.

FIG. 6 is a diagram illustrating the provisional true-value calculating process. The provisional true-value calculating process is a process of searching a preset imaging data range for blocks similar to the block containing the pixel data selected in Step S103, in other words, pixel data that will be subjected to the provisional true-value calculation. This searching is performed by using, for example, the block matching method well known in the art. The phase-difference detecting pixel Gr (right) in FIG. 6 is a pixel subjected to the provisional true-value calculation. Also in FIG. 6, the search area S has a size of 9×7 pixels, and each block has a size of 3×3 pixels. The size of the search area S and the size of the blocks are not limited to those specified in FIG. 6.

In the provisional true-value calculating process actually performed, the provisional true-value calculating unit 3121 sets a base block Base and then a reference block Ref in the search area S. The base block Base is a block whose center is the pixel for which a provisional true-value should be calculated at present (phase-difference detecting pixel Gr (right) in the case of FIG. 6). The reference block Ref is a block set in the search area S and having the same size as the base block Base.

After setting the base block Base and reference block Ref, the provisional true-value calculating unit 3121 calculates the absolute difference value between the output of a pixel of the base block Base and the output of the corresponding pixel of the reference block Ref. In FIG. 6, each arrow indicates a pair of pixels, of which the absolute difference is calculated. FIG. 6 specifies only three pairs of such pixels. In practice, however, the absolute difference value between the outputs of the pixels of any other pair is calculated. After calculating the absolute difference values for all pixels of the base block Base and the reference block Ref, the provisional true-value calculating unit 3121 adds the absolute difference values together, thereby calculating a correlation value.

After calculating the correlation value for one reference block Ref, the provisional true-value calculating unit 3121 shifts the reference block Ref in the search area S. Then, the provisional true-value calculating unit 3121 calculates a correlation value the reference block Ref has after being shifted with respect to the base block Base, in the same manner as described above. Note that the reference block Ref is shifted, for example from the upper-left corner of the search area toward the lower-right corner thereof. However, the distance and direction by and in which the reference block Ref is shifted are not limited.

While the reference block Ref is being shifted as described above, the correlation value for one reference block Ref is repeatedly calculated until the reference block Ref reaches the end of the search area S (for example, the lower-right corner). After the correlation value has been calculated for the reference block Ref located at the end of the search area S, the provisional true-value calculating unit 3121 designates, as a provisional true-value calculating pixel, the pixel at the center of the reference block Ref having the smallest correlation value, namely the reference block Ref that is the most correlated to the base block Base. The provisional true-value calculating process is thus completed. The method of calculating the correlation value is not limited to the method described above. In the above example, were correlated with high whichever correlation value is small, but depending on the method of calculating the correlation values may also be correlated to the high correlation value whichever is greater.

In the provisional true-value calculating process, the provisional true-value calculating pixel is never used as a phase-difference detecting pixel. It therefore suffices to calculate the correlation value of the reference block Ref in which the center pixel is an imaging pixel. In view of this, the reference block Ref may be so shifted, preventing the center pixel in the reference block Ref from becoming a phase-difference detecting pixel.

At the true-value calculating pixel, the sum of absolute differences is used as a correlation value. Instead, a sum of squared differences may be used as a correlation value. Thus, the correlation value can be obtained through a combination of the basic arithmetic operations. In a high-speed imaging drive mode, for example, the sum of absolute differences, not the difference sum square, may be calculated in order to reduce the operation load. Thus, the calculation method can be changed in accordance with the use of the camera.

After the provisional true-value calculating process has been performed, the ratio calculating unit 3122 of the gain estimating unit 312 performs a ratio calculating process (Step S106). In the ratio calculating process, the ratio calculating unit 3122 calculates the ratio between the pixel output of the phase-difference detecting pixel for the current ratio being calculated and the pixel output of the provisional true-value calculating pixel that corresponds to this phase-difference detecting pixel. The ratio of the pixel output Dif_pi is given by the following equation (1):

$$\text{Dif\_pi} = Gr1/Gr2 \qquad (1)$$

where Gr1 is the pixel output of the provisional true-value calculating pixel, and Gr2 is the pixel output of the phase-difference detecting pixel.

As described above, a part of the phase-difference detecting pixel is shielded from light. The pixel output of the phase-difference detecting pixel is smaller than that of the imaging pixel even if the light is applied to the phase-difference detecting pixel in the same amount as to the imaging pixel. The pixel output decrease of the phase-difference detecting pixel, with respect to the pixel output of the imaging pixel, can be obtained simply by calculating the ratio of one to the other. Since the imaging data is not always acquired at a plane of uniform luminance, the pixel output of both the imaging pixel and that of the phase-difference detecting pixel may change, influenced by the image of the object (pattern). If the imaging pixel and the phase-difference detecting pixel differ from each other in terms of pattern, the decrease in the amount of light received at the phase-difference detecting pixel with respect to the amount of light received at the imaging pixel, cannot be accurately determined. As shown in FIG. 7, the object image focused on the imaging element 21 may have a pattern that extends slantwise over the reference block. In this case, the result of the ratio calculating process will be erroneous if the output of a pixel on which the object image is focused differs from the output of any other pixel on which the object image is not focused.

In this embodiment, the decrease in pixel output between an imaging pixel and a correlated phase-difference detecting pixel is determined. Accordingly, the ratio can be obtained by reducing the influence of variations in the pattern. Furthermore, the correlation is obtained in units of blocks in this embodiment. In the case of FIG. 7, for example, a reference block that is highly correlated to the base block is highly likely to be present at the object image, and is similar to the base block. Thus, the ratio can be calculated, less influenced by the pattern, if the imaging pixel of the reference block highly correlated to the base block is used as a provisional true-value calculating pixel.

After the ratio has been calculated, the image processing unit 31 determines if the pixels have been scanned, to determine whether or not the loop process has been completed (Step S107). If it is determined by the image processing unit 31 that the loop process is not completed, it will be continued. If it is determined by the image processing unit 31 that the loop process is completed, it will be terminated. After the loop process has been performed, the gain correcting unit 313 performs a gain correcting process (Step S108). In the loop process composed of Steps S103 to S107, a function which represents the decrease in the amount of light received at the phase-difference detecting pixel with respect to the amount of light received at the imaging pixel is calculated. The function is, for example, a first-degree function of y=ax+b, wherein x is the horizontal coordinate (image height in horizontal), and y is the pixel output of the phase-difference detecting pixel (decrease in the amount of light received at the phase-difference detecting pixel), based on the pixel output of the imaging pixel. Slope a and intercept b of the first-order function are given by, for example, the method of least squares, as shown in the following equations:

$$a = \frac{(n-1)\sum_{i=start\_x}^{n-1} i \times \text{Dif\_pi} - \sum_{i=start\_x}^{n-1} i \sum_{i=start\_x}^{n-1} i \times \text{Dif\_pi}}{(n-1)\sum_{i=start\_x}^{n-1} i^2 - \left(\sum_{i=start\_x}^{n-1} i\right)^2} \qquad (2)$$

$$b = \frac{\sum_{i=start\_x}^{n-1} i^2 \sum_{i=start\_x}^{n-1} \text{Dif\_pi} - \sum_{i=start\_x}^{n-1} i \times \text{Dif\_pi} \sum_{i=start\_x}^{n-1} i}{(n-1)\sum_{i=start\_x}^{n-1} i^2 - \left(\sum_{i=start\_x}^{n-1} i\right)^2}$$

where i is the horizontal coordinate x, and start_x is the start horizontal coordinate x. The equations are based on the assumption that n pixels are arranged in the horizontal direction. The function of the equations (2) is multiplied by the pixel output of the phase-difference detecting pixel, thereby compensating for the decrease in the amount of light represented by the pixel output of the phase-difference detecting pixel.

In the equations (2), the decrease in the amount of light is approximated with the first-degree equation. The decrease in the amount of light may also be approximated with a second-degree equation or a higher-degree equation. Also, the approximation may be achieved by any well-known method other than the method of least squares, such as the Lagrange interpolation or spline interpolation.

After the gain correcting process has been performed, the interpolation determining unit 314 determines the application ratio of the pixel output of the phase-difference detecting pixel, which has been corrected by the gain correcting unit 313 (Step S109). As described above, the application ratio is the weighting coefficient used in a weighted addition, which is adding the gain-corrected pixel data output from the phase-difference detecting pixel to the pixel data output from the pixels around the phase-difference detecting pixel. After the interpolation determining unit 314 has determined the application ratio, the interpolating unit 315 performs interpolation (weighted addition) on the output of the phase-difference detecting pixel and the pixel outputs of the imaging pixels around the phase-difference detecting pixel, in accordance with the application ratio determined by the interpolation determining unit 314 (Step S110).

After the interpolation has been performed, the image processing unit 31 performs an imaging process (Step S111). After the imaging process has been performed, the CPU 29 records, in the recording medium 45, the image data generated in the imaging process and then temporarily stored in the DRAM 41 (Step S112). Next, the CPU 29 determines whether the video recording should be stopped or not (Step S113). More precisely, the CPU 29 determines whether the release button of the console 19 has been pushed again. If the release button has been pushed again, the CPU 29 determines that the video recording should be stopped.

In Step S113, if the CPU 29 determines that the video recording should not be stopped, the CPU 29 returns the process back to Step S101, and the video recording continues. If the CPU 29 determines in Step S113 that the video recording should be stopped, it terminates the process of FIG. 5.

As has been previously described in this embodiment, the gain with which to correct the gain of the pixel output of any phase-difference detecting pixel is estimated in accordance with the ratio of the phase-difference detecting pixel to the imaging pixel that is highly correlated to the phase-difference detecting pixel. If an imaging pixel and a phase-difference detecting pixel are highly correlated, they are similar in image pattern. The pixel output of the imaging pixel and that of the phase-difference detecting pixel can therefore be compared, while being less influenced by the pattern. As a result, the gain with which to correct the pixel output of the phase-difference detecting pixel can be accurately estimated. Additionally, the correlation may be determined in units of blocks, thereby enhancing the accuracy of estimating the gain.

In the embodiment described above, the center pixel of the reference block having the smallest correlation value is used as a provisional true-value calculating pixel. Alternatively, a provisional true-value calculating pixel may be calculated from the averaged weight based on the correlation values calculated for the respective reference blocks. A method of calculating the provisional true-value calculating pixel will be explained. First, of the correlation values calculated for the respective reference blocks, the smallest correlation value is normalized to have a maximum value of 1. Next, the correlation value so normalized is used as a weighting coefficient, calculating the average weighting value for the center imaging pixels of the reference blocks. The average weighting value, thus calculated, is used as the pixel output of the provisional true-value calculating pixel. The accuracy of estimating the gain can thereby be enhanced.

In this embodiment, the search range has a 9×7 pixel size, and the blocks have a 3×3 pixel size. However, the sizes of the search area and blocks are not limited to the sizes shown in FIG. 6. Nor are the shapes of the search area and blocks limited to the shapes shown in FIG. 6. If the phase-difference detecting pixels are not arranged defining a rectangle, the search area and the blocks need not be rectangular. The blocks may have a 1×1 pixel size. Moreover, the search area and the blocks may be changed in size in accordance with various conditions such as the driving mode of the imaging element 21. If the driving mode of the imaging element 21 is one for recording a video or for displaying a live view, the search area is narrowed, thereby enhancing the accuracy of calculating the provisional true-value pixel. In this embodiment, any reference block has a phase-difference detecting pixel at the center. However, the reference block does not necessarily need to have a phase-difference detecting pixel at the center. If the reference block does not have the phase-difference detecting pixel at the center, the provisional true-value pixel will not be positioned at the center of the block, but at the position equivalent to that of the phase-difference detecting pixel.

The processes performed in the embodiment as described above can be stored in the form of programs that the CPU 29 can execute. The programs may be stored in the storage medium provided in an external storage device, such as a memory card (e.g., ROM card, RAM card, etc.), a magnetic disk (e.g., hard disk), an optical disk (e.g., CD-ROM, DVD, etc.) or a semiconductor memory. In this case, the CPU 29 may read the programs from the storage medium provided in the external storage device and may then be controlled by the programs so read, and can therefore perform the processes described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus designed to process pixel outputs of an imaging element including imaging pixels and phase-difference detecting pixels arranged in a phase-difference detecting direction, the apparatus comprising:
a gain correcting unit configured to correct a gain of the pixel output of the phase-difference detecting pixel; and
a gain estimating unit configured to estimate the gain with which to correct the pixel output of the phase-difference detecting pixel,
wherein the gain estimating unit includes a provisional true-value calculating unit configured to calculate a pixel output of a provisional true-value calculating pixel, in accordance with a correlation of the pixel outputs between a base block including the phase-difference detecting pixel and a reference block set in a search area for which a block similar to the base block is searched.

2. The image processing apparatus according to claim 1, wherein the base block is a block composed of one or more pixels including the phase-difference detecting pixel; the reference block is a block shifted in a horizontal, vertical, or slantwise direction from the base block in the search area; and the provisional true-value calculating unit performs basic arithmetic operations on the base block and the reference block to calculate a correlation value, and calculates the pixel output of the provisional true-value calculating pixel from the calculated correlation value.

3. The image processing apparatus according to claim 2, wherein the provisional true-value calculating unit calculates, as the pixel output of the provisional true-value calculating pixel, the pixel output of the imaging pixel located at a position equivalent to the pixel output of the phase-difference detecting pixel of the reference block determined to be the most correlated from the correlation value.

4. The image processing apparatus according to claim 2, wherein the provisional true-value calculating unit uses a plurality of correlation values calculated for a plurality of reference blocks, weight-averaging the pixel outputs of the imaging pixels located at positions equivalent to pixel outputs of the phase-difference detecting pixels of the respective reference blocks, and uses the pixel output obtained by the weight averaging as the pixel output of the provisional true-value calculating pixel.

5. The image processing apparatus according to claim 4, wherein the provisional true-value calculating unit increases a weighting ratio for the pixel outputs of the imaging pixels of the reference block that is determined to be highly correlated from the correlation value.

6. The image processing apparatus according to claim 1, wherein the provisional true-value calculating unit adaptively changes the basic arithmetic operations for calculating the correlation value, a size and shift distance of the base and reference blocks, and a size and shape of the search area, in accordance with an arrangement of the phase-difference detecting pixels or a mode of driving the imaging element.

7. An image processing method designed to process pixel outputs of an imaging element including imaging pixels and phase-difference detecting pixels arranged in a phase-difference detecting direction, the method comprising:
calculating a pixel output of a provisional true-value calculating pixel in accordance with a correlation of the pixel outputs between a base block including a phase-difference detecting pixel and a reference block set in a search area in which the base block is included;
estimating a gain from a ratio of the pixel output of the provisional true-value calculating pixel to the pixel output of the phase-difference detecting pixel; and
correcting a gain of the pixel output of the phase-difference detecting pixel in accordance with the gain estimated.

8. The image processing method according to claim 7, wherein the base block is a block composed of one or more pixels; the reference block is a block shifted in a horizontal, vertical, or slantwise direction from the base block in the search area; and the pixel output of the provisional true-value calculating pixel is calculated by first performing the basic arithmetic operations on the base block and the reference block to calculate a correlation value, and then calculating the pixel output of the provisional true-value calculating pixel from the calculated correlation value.

9. The image processing method according to claim 8, wherein calculating the pixel output of the provisional true-value calculating pixel comprises calculating, as the pixel output of the provisional true-value calculating pixel, the pixel output of the imaging pixel located at a position equivalent to the pixel output of the phase-difference detecting pixel of the reference block determined to be the most correlated from the correlation value.

10. The image processing method according to claim 8, wherein calculating the pixel output of the provisional true-value calculating pixel comprises calculating weight-averaging the pixel outputs of the imaging pixels located at positions equivalent to the pixel outputs of the phase-difference detecting pixels of the respective reference blocks by using a plurality of correlation values calculated for a plurality of reference blocks, and using the pixel output obtained by the weight averaging as the pixel output of the provisional true-value calculating pixel.

11. The image processing method according to claim 10, wherein calculating the pixel output of the provisional true-value calculating pixel comprises increasing a weighting ratio for the pixel outputs of the imaging pixels of the reference block that is determined to be highly correlated from the correlation value.

12. The image processing method according to claim 7, wherein calculating the pixel output of the provisional true-value calculating pixel comprises adaptively changing the basic arithmetic operations for calculating a correlation value, a size and shift distance of the base and reference blocks, and a size and shape of the search area, in accordance with an arrangement of the phase-difference detecting pixels or a mode of driving the imaging element.

13. A non-transitory storage medium storing an image processing program for processing pixel outputs of an imaging element including imaging pixels and phase-difference detecting pixels arranged in a phase-difference detecting direction, the program describing:
calculating a pixel output of a provisional true-value calculating pixel in accordance with a correlation of the pixel outputs between a base block including a phase-difference detecting pixel and a reference block set in a search area in which the base block is included;
estimating a gain from a ratio of the pixel output of the provisional true-value calculating pixel to the pixel output of the phase-difference detecting pixel; and
correcting a gain of the pixel output of the phase-difference detecting pixel in accordance with the gain estimated.

14. The non-transitory storage medium according to claim 13, wherein the base block is a block composed of one or more pixels; the reference block is a block shifted in a horizontal, vertical, or slantwise direction from the base block in the search area; and the pixel output of the provisional true-value calculating pixel is calculated by first performing basic arithmetic operations on the base block and the reference block to calculate a correlation value, and then calculating the pixel output of the provisional true-value calculating pixel from the calculated correlation value.

15. The non-transitory storage medium according to claim 14, wherein calculating the pixel output of the provisional true-value calculating pixel comprises calculating, as the pixel output of the provisional true-value calculating pixel, the pixel output of the imaging pixel located at a position equivalent to the pixel output of the phase-difference detecting pixel of the reference block determined to be the most correlated from the correlation value.

16. The non-transitory storage medium according to claim 14, wherein calculating the pixel output of the provisional true-value calculating pixel comprises calculating weight-averaging the pixel outputs of the imaging pixels located at positions equivalent to pixel outputs of the phase-difference detecting pixels of the respective reference blocks by using a plurality of correlation values calculated for a plurality of reference blocks, and using the pixel output obtained by the weight averaging as the pixel output of the provisional true-value calculating pixel.

17. The non-transitory storage medium according to claim 16, wherein calculating the pixel output of the provisional true-value calculating pixel comprises increasing a weighting ratio for the pixel outputs of the imaging pixels of the reference block that is determined to be highly correlated from the correlation value.

18. The non-transitory storage medium according to claim 13, wherein calculating the pixel output of the provisional true-value calculating pixel comprises adaptively changing the basic arithmetic operations for calculating a correlation value, a size and shift distance of the base and reference blocks, and a size and shape of the search area, in accordance with an arrangement of the phase-difference detecting pixels or a mode of driving the imaging element.

* * * * *